(12) United States Patent
Sridhar et al.

(10) Patent No.: US 7,878,280 B2
(45) Date of Patent: Feb. 1, 2011

(54) LOW PRESSURE HYDROGEN FUELED VEHICLE AND METHOD OF OPERATING SAME

(75) Inventors: K. R. Sridhar, Los Gatos, CA (US); James F. McElroy, Suffield, CT (US)

(73) Assignee: Bloom Energy Corporation, Sunnyvale, CA (US)

( * ) Notice: Subject to any disclaimer, the term of this patent is extended or adjusted under 35 U.S.C. 154(b) by 988 days.

(21) Appl. No.: 11/717,774

(22) Filed: Mar. 14, 2007

(65) Prior Publication Data

US 2007/0196702 A1    Aug. 23, 2007

Related U.S. Application Data

(63) Continuation-in-part of application No. 10/446,704, filed on May 29, 2003, now Pat. No. 7,482,078.

(60) Provisional application No. 60/782,268, filed on Mar. 15, 2006, provisional application No. 60/461,190, filed on Apr. 9, 2003.

(51) Int. Cl.
  *B60K 6/42*    (2007.10)
(52) U.S. Cl. .................. 180/65.22; 180/165; 180/306
(58) Field of Classification Search .............. 180/65.22, 180/65.265, 65.31, 65.21, 69.5, 165, 306; 422/217, 218; 429/26, 34, 13, 19, 20; 903/904, 903/905, 908
See application file for complete search history.

(56) References Cited

U.S. PATENT DOCUMENTS

| | | |
|---|---|---|
| 3,488,266 A | 1/1970 | French |
| 4,041,210 A | 8/1977 | Van Dine |
| 4,182,795 A | 1/1980 | Baker et al. |
| 4,532,192 A | 7/1985 | Baker et al. |
| 4,792,502 A | 12/1988 | Trocciola et al. |
| 4,898,792 A | 2/1990 | Singh et al. |
| 4,917,971 A | 4/1990 | Farooque |
| 4,983,471 A | 1/1991 | Reichner et al. |
| 5,034,287 A | 7/1991 | Kunz |
| 5,047,299 A | 9/1991 | Shockling |
| 5,084,362 A | 1/1992 | Farooque |
| 5,143,800 A | 9/1992 | George et al. |
| 5,169,730 A | 12/1992 | Reichner et al. |
| 5,170,124 A | 12/1992 | Blair et al. |
| 5,302,470 A | 4/1994 | Okada et al. |
| 5,441,821 A | 8/1995 | Merritt et al. |

(Continued)

FOREIGN PATENT DOCUMENTS

EP    1 233 467 A2    8/2002

(Continued)

OTHER PUBLICATIONS

Cell and Stack Construction: Low-Temperature Cells, L.G. Austin, NASA SP-120, 1967.

(Continued)

*Primary Examiner*—Hau V Phan
(74) *Attorney, Agent, or Firm*—The Marbury Law Group PLLC

(57) ABSTRACT

A hydrogen fueled vehicle includes a vehicle body, a hydrocarbon fuel tank, and a low pressure hydrogen gas storage vessel.

8 Claims, 8 Drawing Sheets

U.S. PATENT DOCUMENTS

| | | | |
|---|---|---|---|
| 5,498,487 A | 3/1996 | Ruka et al. | |
| 5,501,914 A | 3/1996 | Satake et al. | |
| 5,505,824 A | 4/1996 | McElroy | |
| 5,527,631 A * | 6/1996 | Singh et al. | 429/20 |
| 5,573,867 A | 11/1996 | Zafred et al. | |
| 5,601,937 A | 2/1997 | Isenberg | |
| 5,686,196 A | 11/1997 | Singh et al. | |
| 5,733,675 A | 3/1998 | Dederer et al. | |
| 5,741,605 A | 4/1998 | Gillett et al. | |
| 5,861,137 A * | 1/1999 | Edlund | 422/217 |
| 5,900,330 A | 5/1999 | Kagatani | |
| 5,955,039 A | 9/1999 | Dowdy | |
| 5,997,594 A * | 12/1999 | Edlund et al. | 422/217 |
| 6,013,385 A | 1/2000 | DuBose | |
| 6,033,794 A | 3/2000 | George et al. | |
| 6,051,125 A | 4/2000 | Pham et al. | |
| 6,280,865 B1 | 8/2001 | Eisman et al. | |
| 6,329,090 B1 | 12/2001 | McElroy et al. | |
| 6,403,245 B1 | 6/2002 | Hunt | |
| 6,436,562 B1 | 8/2002 | DuBose | |
| 6,451,466 B1 * | 9/2002 | Grasso et al. | 429/20 |
| 6,531,243 B2 * | 3/2003 | Thom | 429/96 |
| 6,569,298 B2 | 5/2003 | Merida-Donis | |
| 6,623,880 B1 | 9/2003 | Geisbrecht et al. | |
| 6,673,479 B2 | 1/2004 | McArthur et al. | |
| 6,821,663 B2 | 11/2004 | McElroy et al. | |
| 6,892,840 B2 * | 5/2005 | Meaney, Jr. | 180/65.22 |
| 2001/0010873 A1 | 8/2001 | Thom | |
| 2001/0049035 A1 | 12/2001 | Haltiner, Jr. et al. | |
| 2002/0028362 A1 | 3/2002 | Prediger et al. | |
| 2002/0051898 A1 | 5/2002 | Moulthrop, Jr. et al. | |
| 2002/0058175 A1 | 5/2002 | Ruhl | |
| 2002/0090868 A1 | 7/2002 | Schmitman | |
| 2002/0106544 A1 | 8/2002 | Noetzel et al. | |
| 2002/0114984 A1 * | 8/2002 | Edlund et al. | 429/19 |
| 2002/0132144 A1 * | 9/2002 | McArthur et al. | 429/13 |
| 2002/0142208 A1 * | 10/2002 | Keefer et al. | 429/34 |
| 2003/0129459 A1 | 7/2003 | Ovshinsky et al. | |
| 2003/0162067 A1 | 8/2003 | McElroy | |
| 2003/0167105 A1 | 9/2003 | Colborn | |
| 2003/0196893 A1 * | 10/2003 | McElroy et al. | 204/266 |
| 2003/0205641 A1 * | 11/2003 | McElroy et al. | 244/53 R |
| 2004/0081859 A1 | 4/2004 | McElroy et al. | |
| 2004/0115489 A1 | 6/2004 | Goel | |
| 2004/0137300 A1 | 7/2004 | Gemmen et al. | |
| 2004/0191597 A1 * | 9/2004 | McElroy | 429/26 |
| 2004/0224193 A1 | 11/2004 | Mitlitsky et al. | |
| 2005/0031918 A1 | 2/2005 | Barber et al. | |
| 2005/0048334 A1 | 3/2005 | Sridhar | |

FOREIGN PATENT DOCUMENTS

| | | |
|---|---|---|
| WO | WO 00/69773 | 11/2000 |
| WO | WO 02/10877 | 2/2002 |
| WO | WO 03/094320 A2 | 11/2003 |
| WO | WO 2004/025767 A2 | 3/2004 |
| WO | WO 2004/049479 A2 | 6/2004 |

OTHER PUBLICATIONS

Low Cost, High Efficiency Reversible Fuel Cell Systems, Proceedings of the 2002 U.S. DOE Hydrogen Program Review, NREL/CP-610-32405.

Low Cost Reversible Fuel Cell System, Proceedings of the 2000 U.S. DOE Hydrogen Program Review, Jun. 15, 2000, NREL/CP-570-28890.

Low Cost, Compact Solid Oxide Fuel Cell Generator, NASA Small Business Innovation Research Program.

Small, Ultra Efficient Fuel Cell Systems, Advanced Technology Program ATP 2001 Competition (Jun. 2002).

Low Cost, High Efficiency Reversible Fuel Cell (and Electrolyzer) Systems, Proceedings of the 2001 DOE Hydrogen Program Review NREL/CP-570-30535.

Regenerative Fuel Cells for High Altitude Long Endurance Solar Powered Aircraft, F. Mitlitsky, et al, $28^{th}$ Intersociety Energy Conversion Engineering Conference (IECEC), Jul. 28, 1993, UCRL-JC-113485.

Unitized Regenerative Fuel Cells for Solar Rechargeable Aircraft and Zero Emission Vehicles, F. Mitlitsky, et al, 1994 Fuel Cell Seminar, Sep. 6, 1994, UCRL-JC-117130.

"High Temperature Electrolysis of Steam and Carbon Dioxide", Soren Hojgaard Jensen et al., from Proceedings of Riso International Energy Conference, held at Riso National Laboratory, Denmark, May 19-21, 2003, Riso-R-1405(CN), pp. 204-215, L.S. Peterson and H. Jensen, eds.

Ledjeff, K. et al., "Regenerative Fuel Cell for Energy Storage in PV Systems", Proceedings of the $26^{th}$ Intersociety Energy Conversion Engineering Conference, vol. 3, Conf 26, Aug. 1991, pp. 538-541.

* cited by examiner

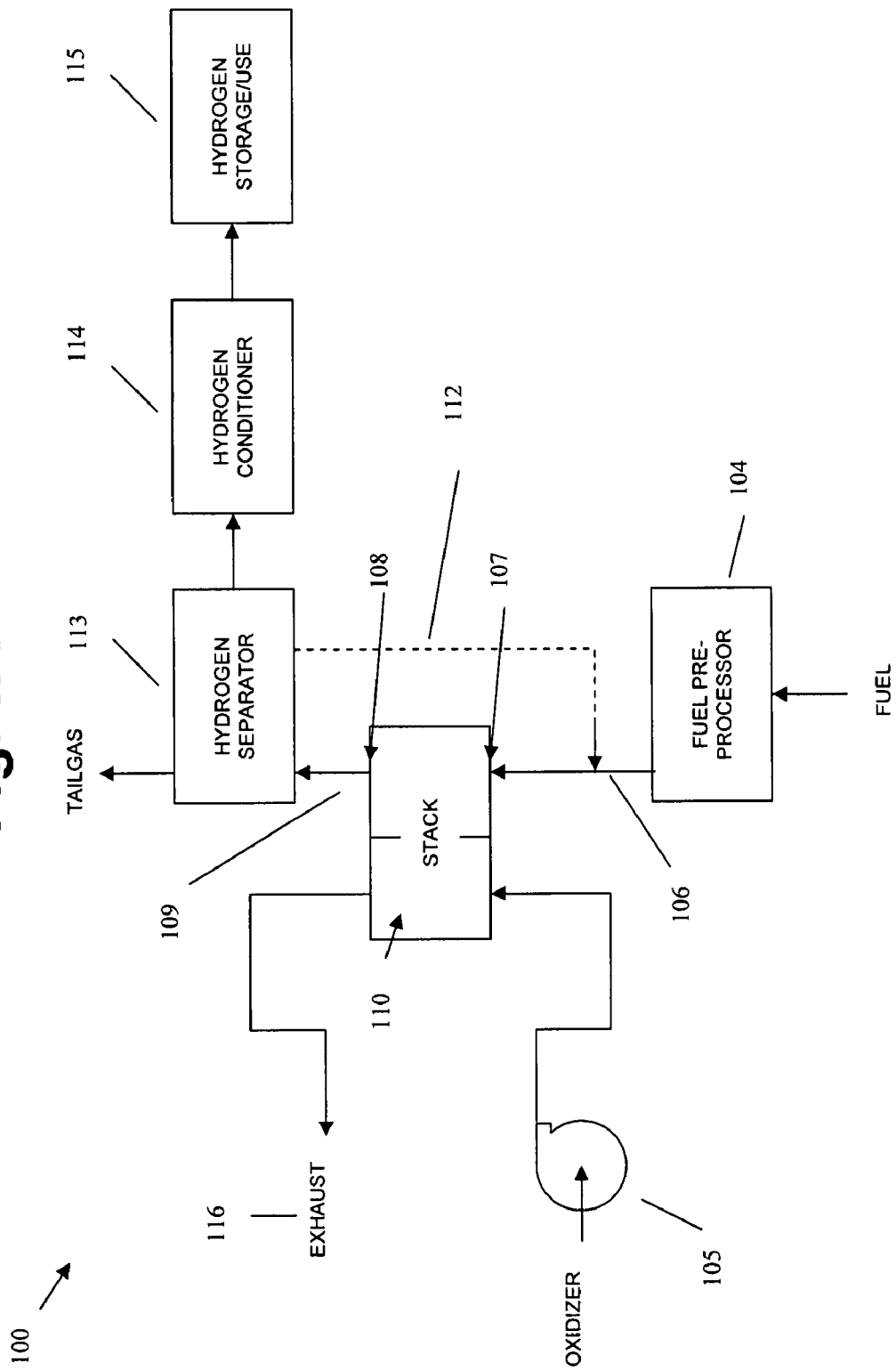

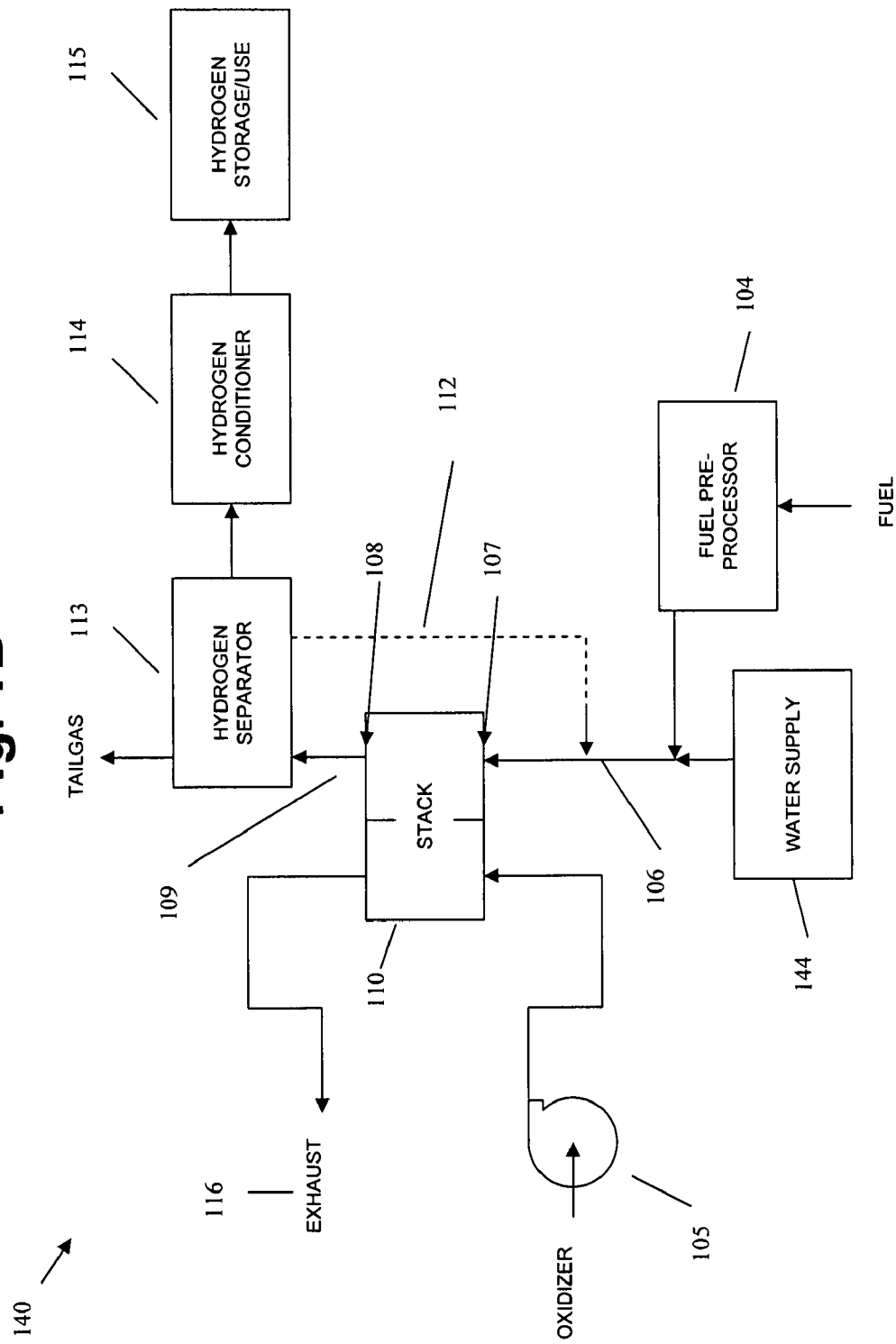

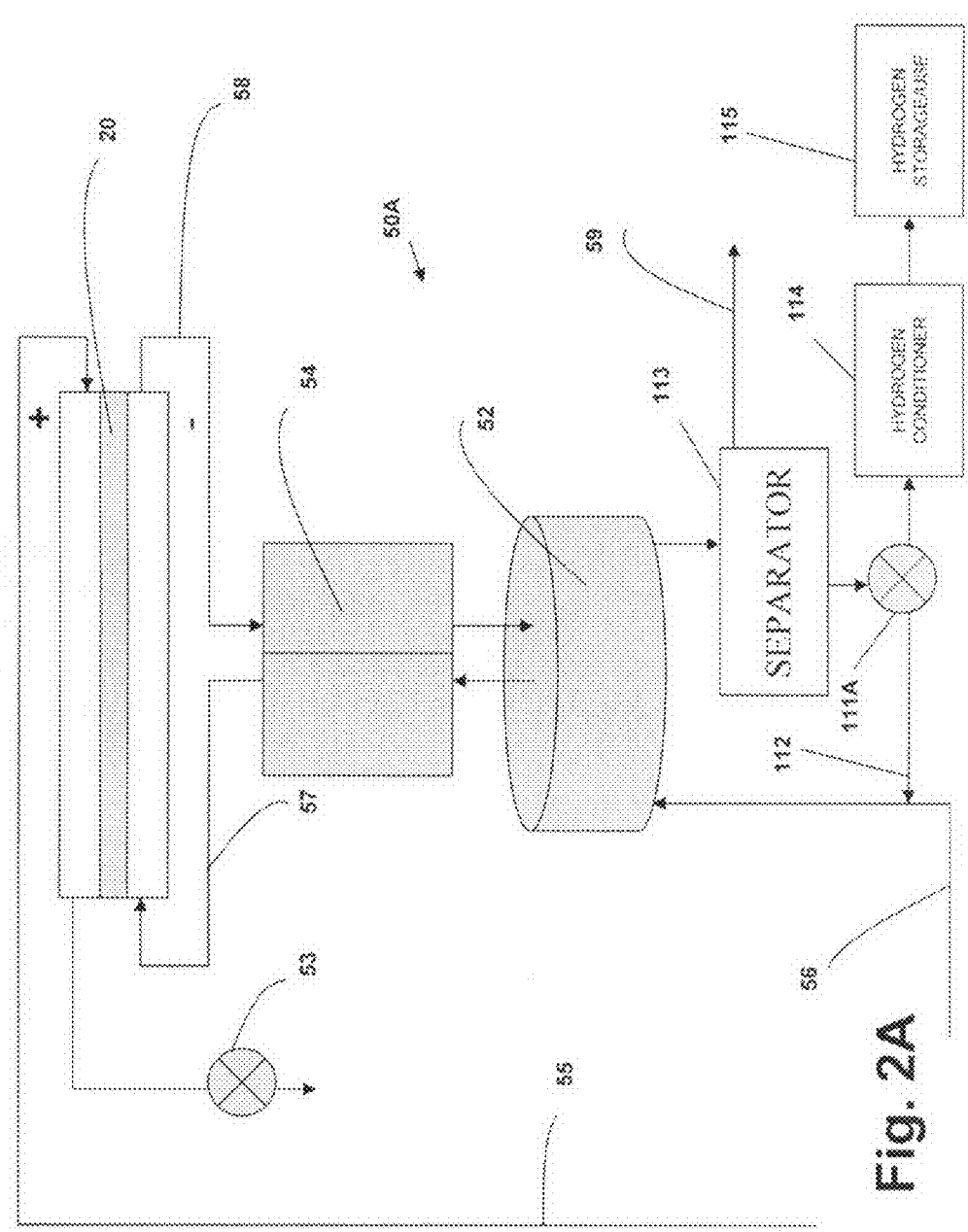

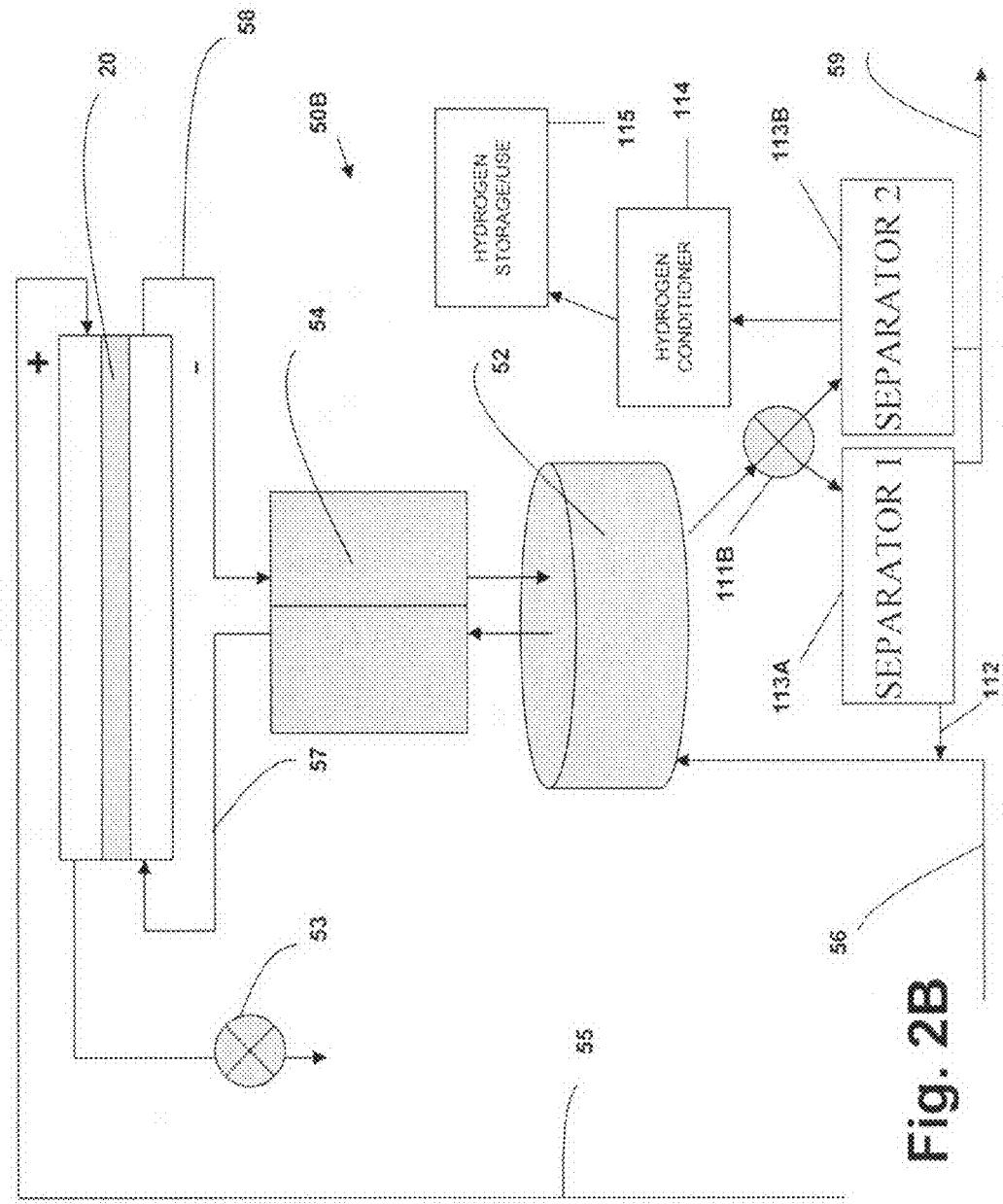

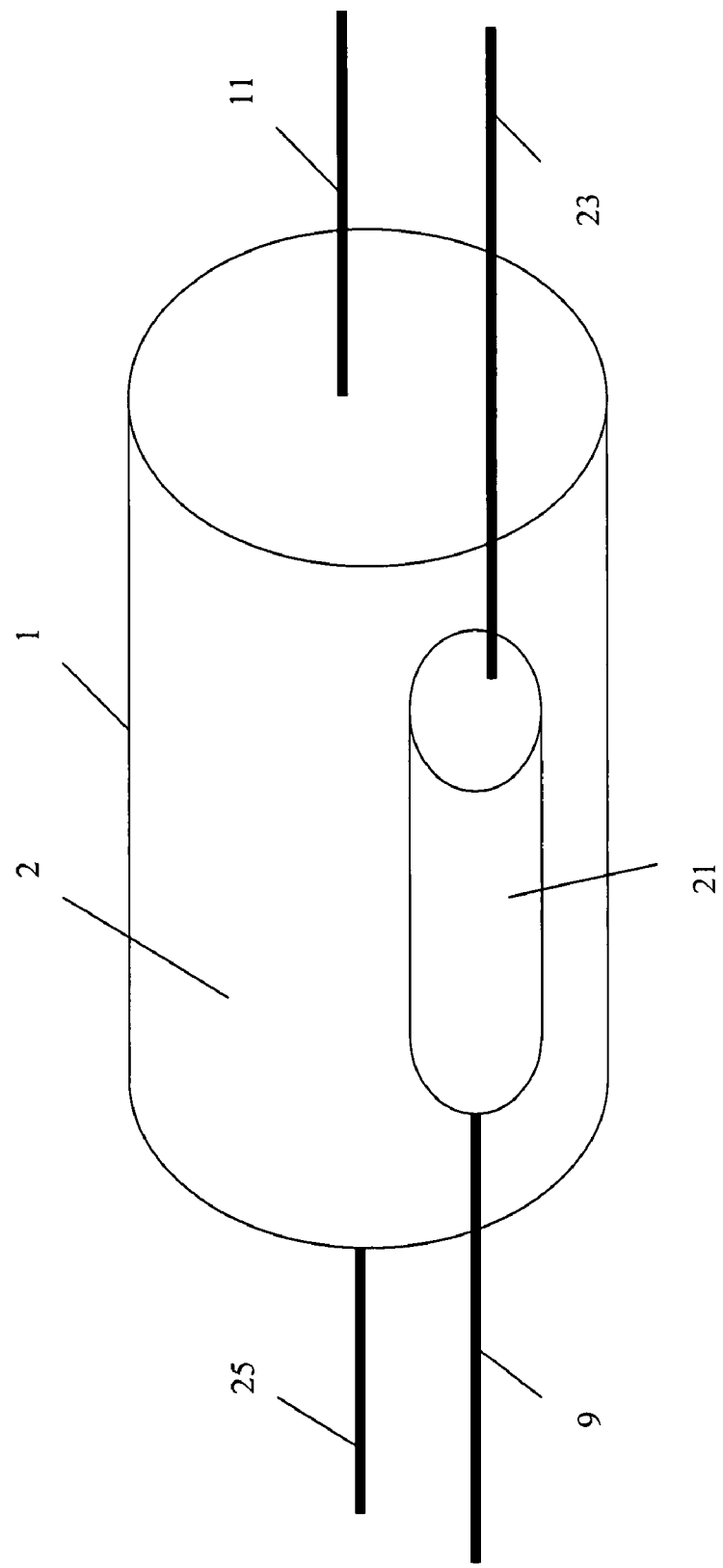

LOW PRESSURE HYDROGEN FUELED VEHICLE AND METHOD OF OPERATING SAME

CROSS-REFERENCE TO RELATED APPLICATIONS

This application is a continuation-in-part of U.S. application Ser. No. 10/446,704 filed on May 29, 2003, which claims benefit of priority of U.S. Provisional Application Ser. No. 60/461,190, filed on Apr. 9, 2003. This application also claims benefit of priority of U.S. Provisional Application Ser. No. 60/782,268 filed on Mar. 15, 2006. All of the above mentioned applications are incorporated herein by reference in their entirety.

FIELD OF THE INVENTION

The present invention is directed generally to hydrogen fueled vehicles.

BACKGROUND OF THE INVENTION

Prior art hydrogen fueled vehicles store hydrogen either as high pressure, compressed gaseous hydrogen or as low pressure liquid hydrogen at a low temperature. It is believed that Daimler Benz developed an internal combustion engine that operated with either hydrogen or gasoline. In this case, a low temperature iron-titanium hydride hydrogen adsorption material was used for hydrogen storage. Fuel cell powered vehicles require hydrogen refueling stations for operation. However, distribution of hydrogen from centralized hydrogen producing plants to refuel vehicles is not currently economical.

SUMMARY

An embodiment of the invention provides a hydrogen fueled vehicle which includes a vehicle body, a hydrocarbon fuel tank, and a low pressure hydrogen gas storage vessel.

BRIEF DESCRIPTION OF THE DRAWINGS

FIGS. 1A, 1B, 1C, 1D, 2A and 2B are system schematics of systems according to an embodiment of the invention.

FIG. 4 is a schematic three dimensional view of a hydrogen storage vessel containing an integrated catalytic converter.

DESCRIPTION OF THE EMBODIMENTS

Figure 1B:
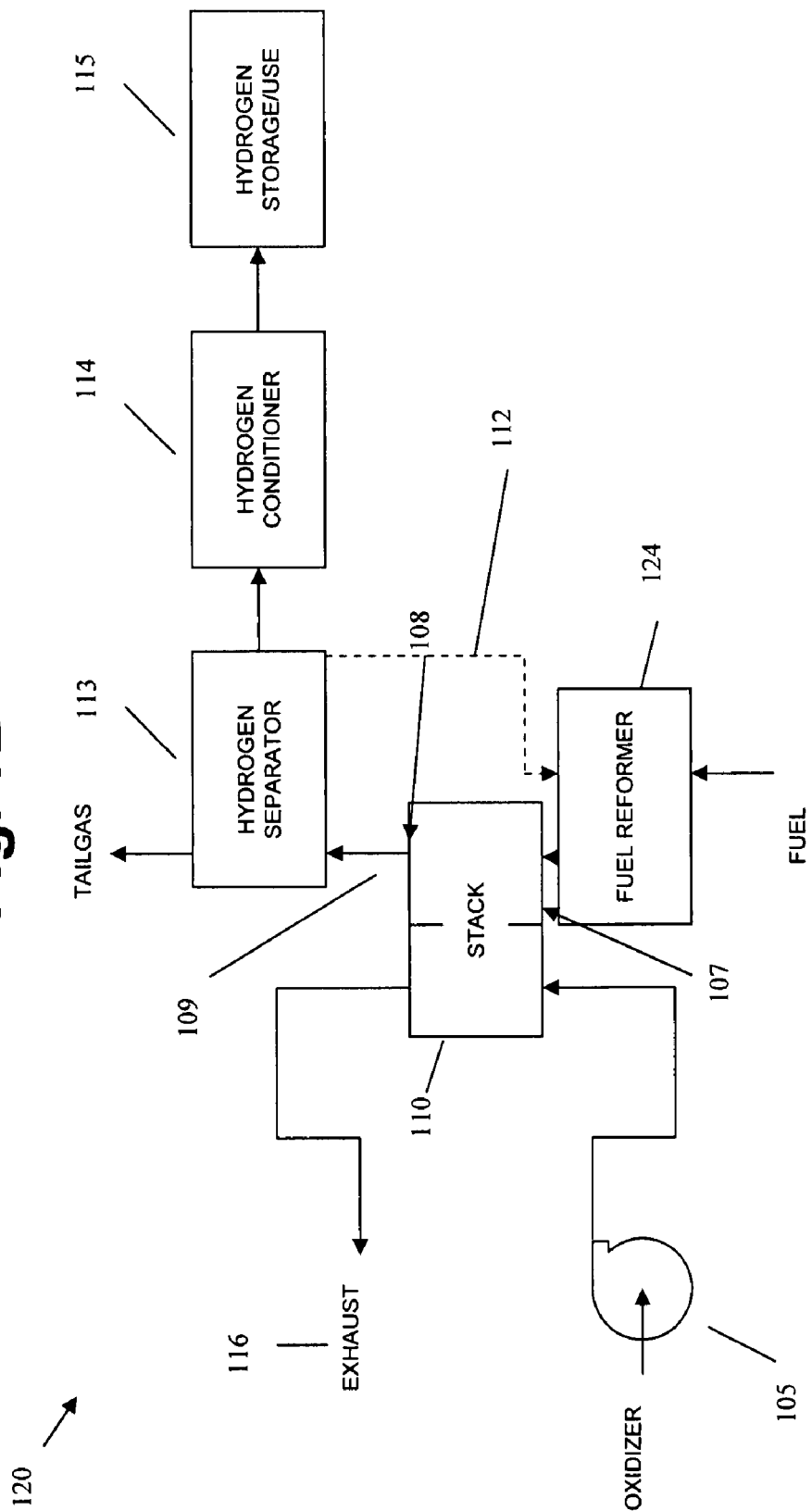

The present inventors have realized that hybrid hydrogen fueled vehicles can store hydrogen as a low pressure with the hydrogen generated by a stationary fuel cell system. The hydrogen can be stored in the gaseous state or adsorbed into a hydrogen adsorbent material.

A hydrogen storage vessel which fits into a conventional sized vehicle, such as a car, SUV or light truck can store a sufficient amount of relatively low pressure gaseous hydrogen to fuel the vehicle for about a 40 to 50 mile range. This range is sufficient for a large percentage of ordinary commutes between home and work or for ordinary shopping or entertainment trips. The hybrid vehicle contains a second, hydrocarbon fuel storage vessel, to provide a hydrocarbon fuel, such as gasoline, diesel or other liquid hydrocarbon fuel, including clean alcohol fuel, such as ethanol, or a blend of ethanol and gasoline, for longer trips. Thus, once the vehicle exhausts its hydrogen supply, it automatically switches to gasoline fuel to continue the trip.

The hybrid vehicle would need to be refueled with low pressure hydrogen about every 40 to 50 miles. This can be accomplished by providing hydrogen generating fuel cell or electrolyzer systems in or adjacent to buildings where the vehicle is ordinarily parked, such as homes (including apartment buildings, town homes and single family homes), work places (including office buildings, factories, shopping areas, etc.), entertainment areas and parking areas, such as garages. These systems would generate electricity for the building and hydrogen to refuel the vehicles. Examples of such systems which generate hydrogen and electricity include solid oxide fuel cells and other high temperature fuel cell systems described in U.S. application Ser. No. 10/446,704 filed on May 29, 2003 (published as US Published Application 2004-0202914 A1), and reversible fuel cell systems, such as solid oxide reversible fuel cell systems described in U.S. application Ser. No. 10/866,238 filed on Jun. 14, 2004 (published as US Published Application 2004-0224193 A1) and in U.S. application Ser. No. 10/653,240 filed on Sep. 3, 2003 (published as US Published Application 2005-0048334 A1), each incorporated herein by reference in its entirety.

These fuel cell systems generate electricity during peak electricity demand times, such as during daytime, and generate hydrogen during off peak times, such as during night time. Alternatively, if the fuel cell system is installed in a work, shopping or entertainment area, then the vehicle can be filled during the day or evening time while the driver is working, shopping or is located in an entertainment area. Night time hydrogen generation, storage and/or filling are preferred because the demand for electrical power is much less during this period. The generated hydrogen may be stored in a storage vessel in a building or adjacent to the building and then provided into the vehicle's hydrogen storage vessel during refueling through a hose or other conduit. The stationary hydrogen storage vessel is fluidly connected to a fuel pump which can be used to pump the hydrogen fuel into the vehicle's hydrogen storage tank.

Alternatively, the fuel cell system may be operated to provide hydrogen to the vehicle on demand rather than storing the hydrogen in a stationary storage vessel. In this case, the fuel cell system is fluidly connected to a hydrogen pump. When the pump is operated to pump hydrogen into the vehicle, the stationary fuel cell system generates hydrogen for the pump in addition to electricity for the building. If a reversible fuel system is used, then the system reverses from an electricity generating fuel cell mode to an electrolyzer mode and the reversible fuel cell system generates hydrogen from water on demand.

Thus, a network of dedicated hydrogen filling stations would not be necessary. Instead, the vehicle can be refueled with hydrogen while it is parked at home, at work or in a shopping or entertainment area using a stationary fuel cell system which generates hydrogen as well as the electricity for the area.

A hybrid vehicle as used herein means a vehicle which contains a hydrogen fuel storage vessel and a hydrocarbon fuel storage vessel such that the vehicle can operate on either a hydrogen fuel or a hydrocarbon fuel, such as gasoline or diesel fuel. The vehicle can contain a single combustion engine which can operate on hydrogen and on a hydrocarbon fuel. In this configuration, the engine is fluidly connected to both the hydrogen storage vessel and to the hydrocarbon fuel storage vessel, such as a gasoline tank.

Alternatively, the vehicle can contain a hydrogen-using fuel cell stack, such as a PEM or other low temperature fuel cell stack (i.e., the non-stationary fuel cell stack), and a combustion engine, such as a gasoline or diesel combustion engine, which can both be used to power the vehicle. In this configuration, the fuel cell stack is fluidly connected to the hydrogen storage vessel while the engine is fluidly connected to the hydrocarbon fuel storage vessel, such as a gasoline tank. The PEM fuel cell stack may provide power to the vehicle drive train and/or may provide electricity to the vehicle electrical components, such as the air conditioning, lighting and other components.

The vehicle can also optionally contain a battery used in conventional gas-electric hybrid vehicles which operates in tandem with the combustion engine to further conserve fuel.

The hydrogen can be provided to and stored in the vehicle's hydrogen storage vessel at any suitable relatively low pressure, such as atmospheric pressure to about 5000 psi. For example, for gaseous hydrogen, an elevated pressure may be needed, such as 1000 to 2500 psi in order to keep the storage vessel to a reasonable size, such as 10 cubic feet or less, for example 3 to 5 cubic feet. For example, about one kilogram, such as 0.8 to 1.5 kilograms of stored hydrogen are sufficient to propel a small commuter car about of 50 miles. The higher the pressure, the smaller the storage vessel that can be used.

By avoiding high pressure hydrogen storage, such as hydrogen storage at above 5000 psi, for example 6000 psi, the costs associated with pressurizing hydrogen to a high pressure can be avoided. Furthermore, the safety of the vehicle is increased due to the lower pressure of the stored hydrogen. By keeping enough hydrogen for a short trip, such as a 40-50 mile trip, a reasonably sized hydrogen tank may be used.

Figure 3:
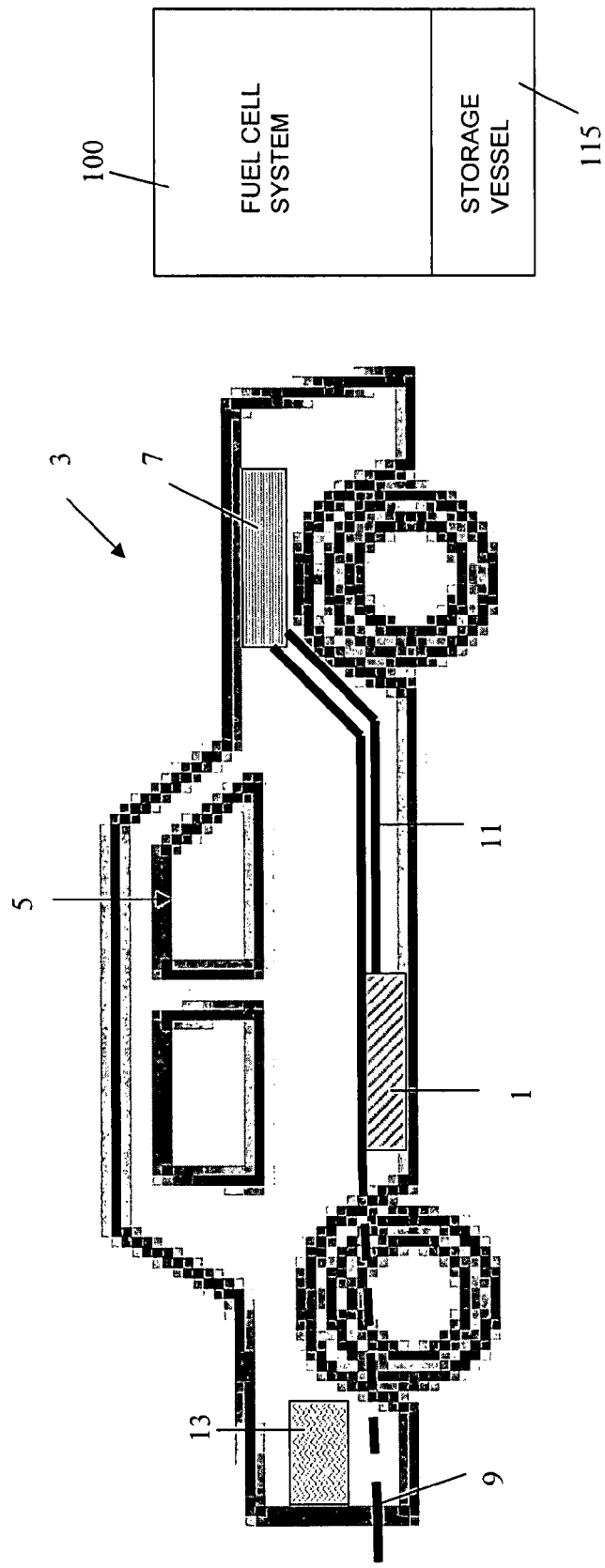
FIG. 3 is a schematic side view of a vehicle containing a hydrogen storage tank.

In an alternative embodiment, the vehicle hydrogen storage vessel contains an adsorbent material which can adsorb hydrogen gas. Examples of such material include metal hydrides, carbon nanotubes and high surface area carbon powder. The adsorbent material is located in a hydrogen storage tank or vessel in any portion of the vehicle, such as in the trunk and/or below the passenger compartment of the vehicle. For example, as shown in FIG. 3, the hydrogen storage vessel 1 is located under the passenger compartment 5 of a vehicle 3.

In this embodiment, the hydrogen gas is provided into the storage vessel and is adsorbed to the adsorbent material. When the hydrogen fuel is needed, it is desorbed from the adsorbent material by increasing the temperature of the adsorbent material, as is well known in the art. For example, a heater may be provided which can heat the storage vessel to desorb the hydrogen fuel on demand. The adsorbent material allows the use of a smaller storage vessel and/or a lower pressure. For example, about 1 kilogram of 50 to 1000 psi hydrogen can be used to fill a reasonably sized tank.

Storing hydrogen in a metal hydride is considered very safe in that a tank rupture stops the flow of hydrogen from the tank as rapid cooling occurs. Therefore an approximately one cubic foot hydrogen storage tank or vessel can be located almost anywhere within the vehicle without considerable safety concerns.

In one embodiment, the hydrogen adsorbent material comprises magnesium hydride family of metal hydrides (i.e., a hydride of pure magnesium or a hydride of an alloy of magnesium and one or more other metal). The magnesium family of metal hydrides is preferred because they can store 7% to 8% hydrogen within their mass. These hydrides typically operate in the about 300° C. temperature range. The hydrogen adsorption process is exothermic and heat must be removed to allow the process to continue at a fixed pressure. The desorption process is endothermic and heat must be added to continually remove the hydrogen at a desired pressure.

During the hydrogen filling from the fuel cell system, the heat is removed and the desired temperature is maintained by generating some of the steam needed for the SOFC or SORFC processes of steam reforming or electrolysis. For example, the hydrogen delivery conduit or hose may be used to transfer some of the heat from the exothermic hydrogen filling reaction back into the fuel cell system using a heat transfer medium, such as air, water, alcohol or other organic heat transfer fluid, located in a periphery of the conduit. Alternatively, a separate heat transfer conduit containing the heat transfer medium may be connected between the hydrogen storage vessel and the fuel cell system during the hydrogen filling of the hydrogen storage vessel to transfer the heat generated in the storage vessel back to the fuel cell system components, such as an external fuel reformer and/or a reversible fuel cell stack.

As shown in FIG. 3, while the vehicle is being driven, the internal combustion engine 7 exhaust is used to increase the hydride temperature to about 300° C. to release the hydrogen for combustion within the engine. For example, the engine exhaust pipe conduit 9 may be passed adjacent to the hydrogen storage vessel 1, as shown in FIG. 3 and/or the conduit 9 may be wrapped around the vessel 1 to heat the vessel 1. The hydrogen is provided from the vessel 1 into the engine 7 through a hydrogen delivery conduit 11. A computer operated valve may be provided in conduit 11 to control the amount of hydrogen being delivered to the engine 7. If the vehicle is powered by low temperature fuel cells, such as PEM fuel cells, instead of an engine, then the fuel cell exhaust may be used in conjunction with a low temperature (~70 C) hydride storage. While the engine 7 is warming to the proper exhaust temperature, the alternate fuel (such as gasoline and/or ethanol) stored in the vehicle fuel tank 13, or a small charge of gaseous hydrogen that is separately stored can be used to heat the hydrogen storage vessel 1.

In another embodiment, the SOFC or SORFC system 100 has its own stationary metal hydride hydrogen storage subsystem 115 located outside the vehicle 3, as shown in FIG. 3. In other words, the hydrogen generated by the fuel cell system 100 is stored in a hydrogen storage vessel 115 containing the metal hydride material prior to the hydrogen being provided into the vehicle 3. In this case, since the mass of the stationary metal hydride is not limited by the vehicle space and weight constraints, the metal hydride in subsystem 115 can have a larger mass and/or volume than the metal hydride in the vehicle hydrogen storage vessel 1 and/or may comprise a different metal hydride material from that in the vessel 1. For example, the metal hydride in subsystem 115 might be selected for other important characteristics, such as adsorption/desorption rates or alternate temperature/pressure ranges.

In this embodiment, the SOFC or SORFC system's hydrogen storage vessel 115 would be filled throughout the day and/or night whenever the demand for electric power is less than the system capability. When the vehicle 3 is connected to the vessel 115 by a conduit or hose to have its storage vessel 1 filled with hydrogen, a full charge of hydrogen is available in vessel 115 for rapid refill. A thermal integration described above between the SOFC or SORFC system 100 and the vehicle 3 can provide the heat needed to transfer hydrogen from vessel 115 into the vehicle's metal hydride storage vessel 1.

It should be noted that the fuel cell system 100 may contain the metal hydride hydrogen storage vessel 115 even if the vehicle's hydrogen storage vessel 1 comprises a low pressure gas storage tank rather than a metal hydride containing storage tank, such as a 500 psi to 1000 psi gas tank. Although the SOFC or SORFC system's 100 metal hydride tank 115 is filled with hydrogen using near ambient pressure hydrogen, the same metal hydride tank 115 can fill the vehicle gas storage tank 1 by increasing the hydride temperature to the appropriate temperature and pressure isotherm using the waste heat of the SOFC or SORFC system 100, such as the heat from the hot fuel exhaust and/or air exhaust streams from the fuel cell stack that passes near and/or around the metal hydride containing tank 115. The heated and high pressure desorbed hydrogen from tank 115 is cooled to near ambient temperature in the transfer conduit or in an intermediate storage vessel before being delivered to the vehicle hydrogen storage vessel 1.

In another embodiment shown in FIG. 4, the catalytic converter 21 which is used to catalytically convert the vehicle's hydrocarbon fuel exhaust is located within the metal hydride containing hydrogen storage vessel 1. As shown in FIG. 4, the fuel exhaust conduit 23 which carries the hydrocarbon fuel exhaust from the vehicle engine 7 enters the storage vessel 1 and connects to the catalytic converter 21 inlet. The outlet of the converter 21 is connected to the vehicle's exhaust conduit 9 which connects to the tail pipe. The converter 21 is surrounded by the metal hydride material 2 located in the storage vessel 1. This configuration provides a rapid start-up response by making the hydrogen available to the engine within seconds. In other words, the heat from the catalytic converter 21 is used to desorb the hydrogen from the metal hydride 2 in the vessel 1. The desorbed hydrogen is then provided to the engine 7 via conduit 11 shown in FIG. 3.

The hydrogen storage vessel (i.e., the metal hydride containing tank) 1 in this embodiment is located under the passenger compartment 5 where the exhaust conduits 9, 23 and the catalytic converter 21 are normally located. When the hydrogen storage vessel 1 is being refilled from the SOFC or SORFC system 100, at least a portion of the exhaust and catalytic converter plumbing can be used to allow thermal control of the hydride from the SOFC or SORFC exhaust streams. FIG. 4 also shows the hydrogen inlet conduit 25 through which the hydrogen is provided from system 100 into the hydrogen storage vessel 1.

An alternative start-up (i.e., initial hydrogen desorption) approach with an integrated catalytic converter 21 is to initially inject a hydrogen and air mixture into the catalytic converter 21 using the converter as a pure combustor to achieve a rapid temperature increase and, therefore, a rapid hydrogen release from the hydrogen storage vessel 1. This process can be used instead of starting desorption with passing the hydrocarbon fuel exhaust through the catalytic converter 21. The initial hydrogen can be injected into the converter 21 from the fuel cell system 100 or from a small start-up hydrogen gas tank located in the vehicle. If the start-up gas tank is present, then it can later be refilled with some of the hydrogen desorbed from the metal hydride containing storage vessel 1. The air for the mixture can be provided from an air inlet.

In another alternative embodiment, rather than providing the hydrogen and hydrocarbon fuels into the internal combustion engine separately (i.e., sequentially), the hydrogen and the hydrocarbon fuels are both provided into the engine at the same time. For example, a small amount of hydrogen, such as for example 3% to 5% hydrogen by volume, is mixed with the hydrocarbon fuel as the hydrocarbon fuel is being combusted in the engine. This improves the burning efficiency of the hydrocarbon fuel, such as ethanol and/or gasoline, and reduces harmful emissions by about 10% to about 30%. The hydrogen and hydrocarbon fuels may be premixed in a mixing conduit or chamber outside the internal combustion chamber of the engine or the hydrogen and hydrocarbon fuels may be separately injected into the combustion chamber of the engine and mixed in the combustion chamber.

A vehicle computer controls the supply and amount of hydrogen and hydrocarbon fuels to the engine. For example, pure hydrogen may be provided into the engine when near zero harmful emissions are required or desired, such as within city limits or parks where strict emission controls are imposed, while a mixture of hydrogen and hydrocarbon fuel may be provided into the engine in areas where less strict emission controls are imposed or required, such as outside city limits. The vehicle computer may be programmed to switch fuels based on data provided by a GPS or other geographic locator system contained in the vehicle. The computer or locator system software provides the areas where strict or lax emission controls are imposed or desired. Alternatively, the computer may receive wireless signals from external signal sources indicating that the vehicle has entered a strict or lax emission control area, and switch the fuels based on the received signals.

Alternatively, the fuels are switched based on the amount of hydrogen remaining in the hydrogen storage vessel 1. When the hydrogen storage vessel 1 contains a significant amount of hydrogen, such as for example when the vessel 1 is more than a quarter full, the vehicle operates on pure hydrogen. When a sensor in the vessel 1 indicates to the vehicle computer that the vessel 1 is nearing empty, such as for example when the vessel 1 is less than a quarter full, the computer switches the vehicle operation to the hydrogen and hydrocarbon fuel mixture until the vessel 1 is refilled with hydrogen.

The following is one non-limiting example of a stationary high temperature electrochemical system, such as a solid oxide electrochemical system, a SOFC or a SORFC system, or a molten carbonate fuel cell system, which can be used to co-produce hydrogen for the vehicle and electricity for the stationary location in the fuel cell mode. The system of the first preferred embodiment generates a hydrogen rich exhaust stream using reforming reactions that occur within the fuel cell stack and/or in a reformer in thermal integration with the fuel cell stack. The amount of hydrogen produced can be controlled by the operator. The hydrogen rich stream is further conditioned if necessary and stored or used directly by the vehicle. Thus, the high temperature electrochemical systems produce purified hydrogen as a by-product of fuel reformation in the fuel cell mode. The electrochemical system may operate in the fuel cell mode, when no external electricity input is required, to generate diffusion of ions across an electrolyte of the system. In contrast, a reversible or regenerative electrochemical system operates in the electrolysis mode when external electricity is required to generate diffusion of ions across the electrolyte of the system.

It should be noted that the electrochemical system of the first embodiment does not necessarily co-produce or co-generate power or electricity for use outside the system. The system may be operated to primarily internally reform a carbon and hydrogen containing fuel into hydrogen with minimal power generation or without delivering or outputting power from the system at all. If desired, a small amount of power may be generated and used internally within the system, such as to keep the system at operating temperature and to power system components in addition to other parasitic loads in the system.

The system of the first preferred embodiment which produces hydrogen in the fuel cell mode may be any high temperature electrochemical system which produces sufficient heat to free bound hydrogen contained in a fuel gas provided into the system. For example, the system may be a solid oxide or a molten carbonate system. The solid oxide system, such as a SOFC or SORFC, is preferred. The following description of the preferred aspects of the present invention describes SOFC or SORFC systems. However, it should be noted that other suitable electrochemical systems may also be used.

Thus, in a preferred aspect of the first embodiment of the present invention, the high temperature electrochemical system is a SOFC or a SORFC system which co-produces electricity and hydrogen in the fuel cell mode. A SOFC or SORFC system operates in the fuel cell mode when oxygen ions diffuse through an electrolyte of the fuel cells from the oxidizer side to the fuel side of the fuel cell containing the carbon and hydrogen containing gas stream. Thus, when the high temperature electrochemical system, such as a SOFC or SORFC system operates in the fuel cell mode to generate hydrogen, a separate electrolyzer unit operating in electrolysis mode and which is operatively connected to the fuel cell stack is not required for generation of hydrogen. Instead, the hydrogen is separated directly from the fuel cell stack fuel side exhaust gas stream without using additional electricity to operate a separate electrolyzer unit.

When an SORFC system is used rather than an SOFC system, the SORFC system can be connected to a primary source of electricity (e.g., grid power) and can accept electricity from the primary source when desirable or can deliver electricity to the primary source when desirable. Thus, when operating the SORFC system of the first preferred embodiment, the system operator does not have to sacrifice electricity production to produce hydrogen, and vice versa. The SORFC system does not require a hot thermal mass which absorbs heat in the fuel cell mode and which releases heat in the electrolysis mode for operation or energy storage. However, a hot thermal mass may be used if desired. Furthermore, the system may use, but does not require a fuel reformer.

Furthermore, in a preferred aspect of the first embodiment, a relative amount of hydrogen and electricity produced can be freely controlled. All or a portion of the hydrogen in the fuel side exhaust stream may be recirculated into the fuel inlet stream to provide control of the amount of electricity and hydrogen being co-produced in the system, as will be described in more detail below. The hydrogen product can be further conditioned, if necessary, and stored or used directly in a vehicle in a near ambient state.

FIG. 1A illustrates an SOFC or SORFC electricity generation system 100 according to the first preferred embodiment. The system derives power from the oxidation of a carbon and hydrogen containing fuel, such as a hydrocarbon fuel, such as methane, natural gas which contains methane with hydrogen and other gases, propane or other biogas, or a mixture of a carbon fuel, such as carbon monoxide, oxygenated carbon containing gas, such as methanol, or other carbon containing gas with a hydrogen containing gas, such as water vapor, $H_2$ gas or their mixtures. For example, the mixture may comprise syngas derived from coal or natural gas reformation. Free hydrogen is carried in several of the system process flow streams. The carbon containing fuel is provided into the system from a fuel source, which may comprise a fuel inlet into the fuel cell stack, a fuel supply conduit and/or a fuel storage vessel.

The system illustrated in FIG. 1A contains a fuel preprocessor subsystem 104, which may contain a heat exchanger and/or other fuel processing elements. In one preferred aspect of the present invention, the fuel preprocessor subsystem 104 converts a biogas, such as natural gas, to methane, and supplies methane into the fuel cell. The system 100 also contains an oxidizer inlet conduit 105, which preferably contains an air or other oxidizer blower (schematically shown in FIG. 1), and fuel inlet 106 and outlet 109 conduits. The system also contains a stack of SOFCs or SORFCs 110, which have a fuel inlet 107 and a fuel outlet 108. The stack 110 preferably contains the fuel cells, separator plates, seals, gas conduits, heaters, thermal insulation, control electronics and various other suitable elements used in fuel cell stacks. If desired, the system may have an optional oxidizer exhaust or outlet 116. Alternatively, the oxidizer outlet may be omitted to allow all oxygen to diffuse from the oxidizer inlet conduit 105 through the fuel cell electrolyte. The oxidizer inlet conduit 105 may also be used as an oxygen outlet when a SORFC is operated in the electrolysis mode. Water may be recirculated into the fuel inlet 107 from the fuel outlet 108, as will be described in more detail with respect to FIGS. 2A and 2B. Additional details of FIGS. 2A and 2B are described in U.S. application Ser. No. 10/446,704 which is incorporated herein by reference.

The system 100 also contains at least one hydrogen separator 113. The hydrogen separator 113 may comprise any device which can separate some or all hydrogen from a hydrogen containing gas stream. Preferably, the hydrogen separator is a device which can separate a desired or variable amount of hydrogen from a hydrogen gas containing stream, depending on user requirements. Alternatively, the hydrogen separator 113 may comprise a device which separates all or substantially all hydrogen from a hydrogen containing gas stream.

The hydrogen separator 113 may comprise one or more polymeric proton exchange membranes, ceramic proton exchange membranes, polymeric gas separation membranes, adsorption-based gas separation columns (such as pressure swing adsorption units), and flow diverting devices such as valves. The suitable device may be selected based on the state point of the gas stream (composition, temperature, and pressure), the desired product purity, available volume that depends on the specific generator design, and economic factors.

The system 100 also contains an optional hydrogen conditioner 114. The hydrogen conditioner 114 may be any suitable device which can purify, dry, compress (i.e., a compressor), or otherwise change the state point of the hydrogen-rich gas stream provided from the hydrogen separator 113. If desired, the hydrogen conditioner 114 may be omitted.

The system 100 also contains a hydrogen storage/use subsystem 115. This subsystem 115 may comprise a hydrogen storage vessel, such as a hydrogen storage tank or a hydrogen dispenser, such as a hydrogen pump which provides hydrogen or a hydrogen-rich stream to the vehicle.

For example, the system 100 may be located in a stationary location, such as a building or an area outside or below a building and is used to provide power to the building. Additional fuel cells may be located in vehicles located in a garage or a parking area adjacent to the stationary location. In this case, the carbon and hydrogen containing fuel is provided to the system 100 to generate electricity for the building and to generate hydrogen which is provided as fuel to the fuel cell powered vehicles. The generated hydrogen may be stored temporarily in a storage vessel and then provided from the storage vessel to the vehicle fuel cells on demand (analogous to a gas station) or the generated hydrogen may be provided directly from the system 100 to the vehicle fuel cells.

In one preferred aspect of the present invention, the hydrogen separator 113 is used to separate and route hydrogen from the fuel side exhaust stream only into the subsystem 115. In another preferred aspect of the present invention, the hydrogen separator 113 is used to separate hydrogen from the fuel side exhaust stream and to route all or a part of the hydrogen back into the fuel inlet 107 of the fuel cell stack 110 through conduit 112, to route all or part of the hydrogen to the subsystem 115 and/or to route the hydrogen out with the tail gas.

Alternatively, two different hydrogen separators may be used to route the hydrogen to the conduit 112 and to the subsystem 115, as shown in FIG. 2B and described in more detail below. Thus, the fuel side exhaust is separated by a valve or another device to two different hydrogen separators. The first hydrogen separator separates hydrogen from the first part of the fuel side exhaust and routes the hydrogen to conduit 112 to be recirculated into the inlet 107. The second hydrogen separator separates hydrogen from the second part of the fuel side exhaust and routes the hydrogen to the subsystem 115. Thus, the amount of hydrogen provided to conduit 112 and to subsystem 115 may be varied by controlling the amount of fuel side exhaust provided into each hydrogen separator.

Alternatively, only one hydrogen separator 113 is used. A valve or another device separates the hydrogen output from the separator into conduit 112 and into subsystem 115. Thus, the valve or another such device determines the amount of hydrogen provided to conduit 112 and subsystem 115. In both cases the valve or similar device may be controlled by an operator or controlled automatically by a computer based on predetermined data or on input parameters.

FIG. 1B illustrates a system 120 according to an alternative aspect of the first preferred embodiment. The system 120 is identical to the system 100 illustrated in FIG. 1A, except that the system 120 contains a fuel reformer 124 upstream of the fuel inlet 107. Preferably, the fuel reformer is included in the system 120 instead of the fuel preprocessing subsystem 104. However, if desired, the fuel reformer 124 may be used together with the fuel preprocessing subsystem 104, such that the output of the subsystem 104 is provided into the reformer.

The fuel reformer 124 may be any suitable device which is capable of reforming a carbon and bound hydrogen containing fuel to form a carbon containing fuel and free hydrogen. For example, the fuel reformer 124 may be any suitable device which can reform a hydrocarbon gas into a gas mixture of free hydrogen and a carbon containing gas. For example, the fuel reformer 124 may reform a biogas, such as natural gas to form free hydrogen and carbon monoxide. The free hydrogen and carbon monoxide are then provided into the fuel inlet 107 of the fuel cell stack 110. If desired, some or all free hydrogen may also be separated from the carbon containing gas by an additional hydrogen separator prior to entry into the fuel cell stack 110 and provided to the hydrogen storage/use subsystem 115.

In a preferred aspect of the first embodiment, the fuel reformer 124 is thermally integrated with the fuel cell stack 110. The term "thermally integrated" in this context means that the heat from the reaction in the fuel cell stack 110 drives the net endothermic fuel reformation in the fuel reformer 124. The fuel reformer 124 may be thermally integrated with the fuel cell stack 110 by placing the reformer 124 and stack 110 in physical and thermal contact with each other, or by providing a thermal conduit or thermally conductive material which connects the stack 110 to the reformer 124. While less preferred, a separate heater may also be used to heat the reformer 124 instead of or in addition to the heat provided from the stack 110. If any hydrogen is recycled from the separator 113 back into the fuel cell stack 110, then the hydrogen may be provided by the conduit 112 directly into the reformer 124 or into the fuel cell stack 110 inlet 107.

Figure 1C:
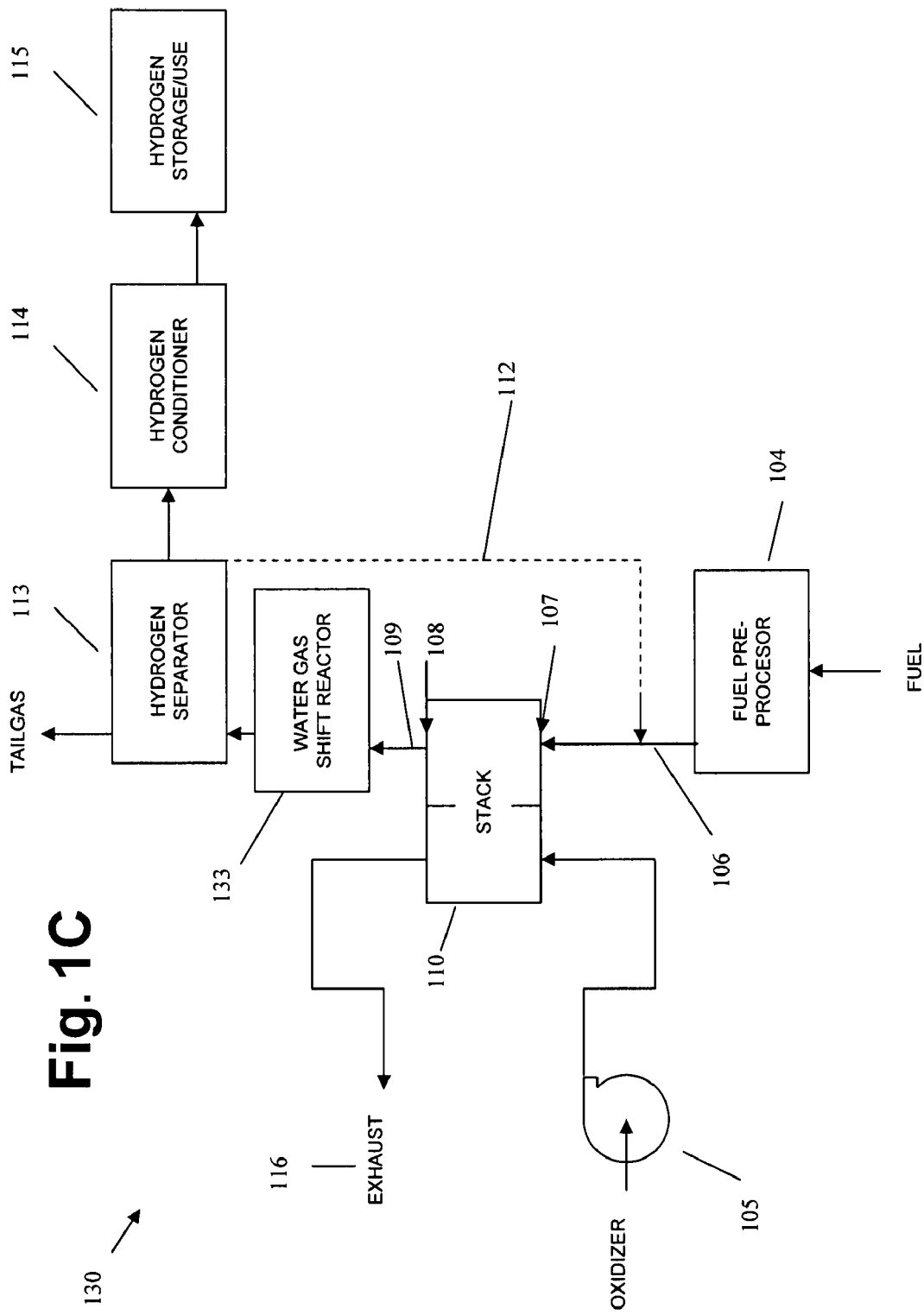

FIG. 1C illustrates a system 130 according to an alternative aspect of the first preferred embodiment. The system 130 is identical to the system 100 illustrated in FIG. 1A, except that the system 130 contains a water-gas shift reactor 133. The water-gas shift reactor 133 may be any suitable device which converts at least a portion of the water exiting the fuel cell stack 110 fuel outlet 108 into free hydrogen. For example, the reactor 133 may comprise a tube or conduit containing a catalyst which converts some or all of the carbon monoxide and water vapor in the tail gas exiting outlet 108 into carbon dioxide and hydrogen. The catalyst may be any suitable catalyst, such as an iron oxide or chromium promoted iron oxide catalyst. The reactor 133 is preferably located between the outlet 108 and the hydrogen separator 113 (i.e., downstream of the outlet 108 and upstream of the separator 113).

The reactor 133 works in tandem with the separator 113 by increasing the amount of free hydrogen in the fuel side exhaust (i.e., tail gas) by converting some or all water present in the fuel side exhaust gas into hydrogen. The reactor 133 then provides hydrogen and carbon dioxide to the separator 113. The separator 113 separates the hydrogen from the carbon dioxide. Thus, all or some of the water present in the fuel may be converted to hydrogen in the reactor 133.

FIG. 1D illustrates a system 140 according to an alternative aspect of the first preferred embodiment. The system 140 is identical to the system 100 illustrated in FIG. 1A, except that the system 140 contains a water supply 144. The water supply 144 may be any suitable liquid water and/or water vapor supply device, such as a water conduit or storage tank. The water supply is located upstream of the fuel inlet 107 to provide water into the fuel inlet 107 in addition to the fuel being provided to the inlet from the preprocessing subsystem 104 or the reformer 124.

The water supply 144 is preferably, but not necessarily, used to provide water into the fuel inlet 107 when the fuel cell stack 110 is operated to generate hydrogen while generating little or no electricity in the fuel cell mode (i.e., no net electricity is produced in the fuel cell mode). The additional water is used to support fuel reforming as needed.

The elements of systems 100, 120, 130 and 140 may be used in any suitable combination. For example, the reformer 124, the reactor 133 and the water supply 144 may be used together in one system with or without the fuel preprocessing subsystem 104. Furthermore, any two or three elements selected from the fuel preprocessing subsystem 104, the reformer 124, the reactor 133 and the water supply 144 may be used together in the same system.

The systems 100, 120, 130 and 140 illustrated in FIGS. 1A-1D may have other embodiments and configurations, as desired. Other components, such as fuel side exhaust stream condensers, heat exchangers, heat-driven heat pumps, turbines, additional gas separation devices, may be added if desired, as described, for example, in U.S. application Ser. Nos. 10/300,021, filed on Nov. 20, 2002 and 11/002,681 filed on Dec. 3, 2004, both incorporated herein by reference in their entirety.

A preferred method of operating the systems 100, 120, 130, 140 will now be described. The systems are preferably operated so that excess fuel is provided to the fuel cell stack 110. Any suitable carbon containing and hydrogen containing fuel is provided into the fuel cell stack. The fuel may comprise a fuel such as a hydrocarbon fuel, such as methane, natural gas which contains methane with hydrogen and other gases, propane or other biogas.

If desired, hydrogen and/or water vapor may be added to the hydrocarbon fuel. Alternatively, the fuel may comprise a mixture of a non-hydrocarbon carbon containing gas, such as carbon monoxide, carbon dioxide, oxygenated carbon containing gas such as methanol or other carbon containing gas with a hydrogen containing gas, such a water vapor or hydrogen gas, for example the mixture may comprise syngas derived from coal or natural gas reformation. The hydrogen and water vapor may be recycled from the fuel side exhaust gas stream or provided from hydrogen and water vapor conduits or storage vessels.

The reformation reactions occur within the fuel cell stack 110 and/or in the optional reformer 124 and result in the formation of free hydrogen in the fuel side exhaust gas stream. For example, if a hydrocarbon gas such as methane is used as a fuel, then the methane is reformed to form a mixture containing non-utilized hydrogen, carbon dioxide and water vapor in the fuel cell stack 110. If natural gas is used as a fuel, then the natural gas may be converted to methane in the preprocessing subsystem 104 or it may be reformed directly to a non-hydrocarbon carbon containing gas such as carbon monoxide in the reformer 124.

The following Table I summarizes one or more reactions that may occur within the fuel cell stack 110 when methane is supplied to the stack.

TABLE I

| | |
|---|---|
| Steam-methane reforming | $CH_4 + H_2O \rightarrow CO + 3H_2$ |
| Water-gas shift | $CO + H_2O \rightarrow CO_2 + H_2$ |
| CO oxidation | $CO + \frac{1}{2}O_2 \rightarrow CO_2$ |
| Hydrogen oxidation | $H_2 + \frac{1}{2}O_2 \rightarrow H_2O$ |
| Partial oxidation | $CH_4 + \frac{1}{2}O_2 \rightarrow CO + 2H_2$ |

If a mixture of a hydrogen containing gas and a non-hydrocarbon carbon containing gas, such as carbon monoxide, is used as a fuel, then some of the carbon monoxide is converted to carbon dioxide in the fuel cell stack 110 and a gas mixture including carbon monoxide, carbon dioxide and unutilized hydrogen is provided from the fuel cell stack 110. If the water-gas shift reactor 133 is included in the system, then it converts some of the carbon monoxide and water vapor in the fuel side exhaust gas stream to hydrogen and carbon dioxide.

Preferably, the fraction of hydrogen separated by the hydrogen separator 113 and the amount of total fuel provided to the fuel cell stack 110 for electricity and hydrogen production are variable and under the control of an operator operating a control unit of the system. An operator may be a human operator who controls the hydrogen separation and electricity production or a computer which automatically adjusts the amount of hydrogen separation and electricity production based on predetermined criteria, such as time, and/or based on received outside data or request, such as a demand for electricity by the power grid and/or a demand for hydrogen by the subsystem 115. Controlling these two parameters allows the operator to specify largely independently the amount of hydrogen produced and the amount of electricity generated. The outside data or request may comprise one or more of electricity demand, hydrogen demand, electricity price and hydrogen price, which may be transmitted electronically to a computer system operator or visually or audibly to a human system operator.

In one extreme, when the user of the system needs electricity but does not need additional hydrogen, then the operator can choose to have the hydrogen containing streams recirculated back into the fuel cell stack 110 by the separator 113 through conduit 112 while providing no hydrogen or a minimum amount of hydrogen to the subsystem 115.

In another extreme, when the user of the system needs hydrogen but does not need any electricity generated, the operator can choose to have the fuel cell stack 110 act primarily to internally reform the carbon containing fuel into hydrogen with minimal power generation and/or minimal or no external power output/delivery from the system. A small amount of power may be generated to keep the system at operating temperature and to power the hydrogen separator 113 and conditioner 114, if necessary, in addition to other parasitic loads in the system. All or most of the hydrogen from the separator 113 is provided to the subsystem 115 rather than to the conduit 112. In this case, additional water from the water supply 144 is preferably added to the fuel.

In the continuum between the two extremes, varying amounts of hydrogen and electricity may be needed simultaneously. In this case, the operator can choose to divert varying amounts of the hydrogen enriched stream from the separator 113 to conduit 112 and subsystem 115 while simultaneously generating the desired amount of electricity. For example, if more hydrogen is recirculated back into the fuel cell stack 110 through conduit 112, then more electricity is generated but less hydrogen is available for use or storage in the subsystem 115. The trade off between the amount of electricity and hydrogen produced can vary based on the demand and the price of each.

The trade off between the amount of electricity and hydrogen generated may also be achieved using several other methods. In one method, the amount of fuel provided to the fuel cell stack 110 is kept constant, but the amount of current drawn from the stack 110 is varied. If the amount of current drawn is decreased, then the amount of hydrogen provided to the hydrogen separator 113 is increased, and vice versa. When less current is drawn, less oxygen diffuses through the electrolyte of the fuel cell. Since the reactions which produce free hydrogen (i.e., the steam-methane reforming reaction (if methane is used as a fuel) and the water-gas shift reaction) are substantially independent of the electrochemical reaction, the decreased amount of diffused oxygen generally does not substantially decrease the amount of free hydrogen provided in the fuel side exhaust gas stream.

In an alternative method, the amount of current drawn from the stack is kept constant, but the amount of fuel provided to the stack 110 is varied. If the amount of fuel provided to the stack 110 is increased, then the amount of hydrogen provided to the hydrogen separator 113 is increased, and vice versa.

In another alternative method, both the amount of current drawn and the amount of fuel provided into the fuel cell stack 110 are varied. The amount of hydrogen generated generally increases with decreasing amounts of drawn current and with increasing amounts of fuel provided into the fuel cell stack. The amount of hydrogen generated generally decreases with increasing amounts of drawn current and with decreasing amounts of fuel provided into the fuel cell stack.

Preferably, the systems of the first preferred embodiment may be operated at any suitable fuel utilization rate. Thus, 0 to 100 percent of the fuel may be utilized for electricity production. Preferably, 50 to 80 percent of the fuel is utilized for electricity production and at least 10 percent, such as 20 to 50 percent, of the fuel is utilized for hydrogen production. For example, a 100 kWe SOFC system may be used to generate from about 70 to about 110 kWe of electricity and from about 45 to about 110 kg/day of high pressure hydrogen when 50 to 80 percent of the fuel is utilized for electricity production. The present inventors have determined that the systems of the first preferred embodiment may be used to produce hydrogen cost effectively. Thus, the method of the first preferred embodiment provides a reduction in the cost of hydrogen production.

If the fuel cell stack 110 is a solid oxide regenerative fuel cell (SORFC) stack which is connected to a primary source of power (such as a power grid) and a source of oxidized fuel (such as water, with or without carbon dioxide), then the device can operate transiently in an electrolysis mode as an electrolyzer to generate hydrogen streams, methane streams, or mixtures when economically advantageous (e.g., when the cost of electricity is inexpensive compared to the cost of the fuel containing bound hydrogen), or during times when the demand for hydrogen significantly exceeds the demand for electricity. At other times, the system 100 can be used in the fuel cell mode to generate electricity from the stored hydrogen or carbon containing fuel. Thus, the system 100 can be used for peak shaving.

In a second embodiment, a solid oxide reversible fuel cell (SORFC) stack is used to provide hydrogen to the vehicle. The SORFC stack generates electricity but not hydrogen in the fuel cell mode during high electricity demand times and generates hydrogen from water in the electrolysis mode during low electricity demand times.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A method of operating a vehicle, comprising:
   operating the vehicle using a stored hydrogen as a fuel;
   operating the vehicle using a mixture of a stored hydrocarbon fuel and the stored hydrogen as a fuel;
   determining a location of the vehicle by a vehicle computer;
   the vehicle computer determining whether the location of the vehicle is associated with operation of the vehicle on the stored hydrogen; and
   the vehicle computer switching from operating the vehicle using the mixture of the stored hydrocarbon fuel and the stored hydrogen to operating the vehicle using the stored hydrogen when the vehicle arrives at the location associated with operation of the vehicle on the stored hydrogen.

2. The method of claim 1, further comprising:
   the vehicle computer determining an amount of remaining stored hydrogen available to the vehicle; and
   the vehicle computer switching from operating the vehicle using the stored hydrogen to operating the vehicle using the mixture of the stored hydrocarbon fuel and the stored hydrogen when the amount of remaining stored hydrogen fuel is less than or equal to a threshold amount.

3. The method of claim 1, wherein the hydrocarbon fuel comprises ethanol, gasoline or a mixture of ethanol and gasoline.

4. The method of claim 1, wherein the vehicle computer determining whether the location of the vehicle is associated with operation of the vehicle on the stored hydrogen comprises the vehicle computer determining that the location is subject to an emissions standard and that compliance with the emissions standard requires operation of the vehicle on the stored hydrogen.

5. The method of claim 1, wherein the vehicle computer determining the location of the vehicle comprises the vehicle computer determining GPS coordinates of the vehicle.

6. The method of claim 1, wherein:
   operating the vehicle using the stored hydrogen as a fuel comprises providing the stored hydrogen into an engine of the vehicle; and
   operating the vehicle using the mixture of the stored hydrocarbon fuel and the stored hydrogen as a fuel comprises providing the mixture of the stored hydrocarbon fuel and the stored hydrogen into the engine of the vehicle.

7. The method of claim 6, wherein the stored hydrogen is stored in a vehicle hydrogen storage vessel and the stored hydrocarbon fuel is stored in a vehicle fuel tank which is separate from the vehicle hydrogen storage vessel.

8. The method of claim 7, further comprising:
   generating hydrogen using a stationary fuel cell system; and
   refueling the vehicle with hydrogen by providing the hydrogen generated by the stationary fuel cell system into the vehicle hydrogen storage vessel.

* * * * *